(12) United States Patent
Notstrand et al.

(10) Patent No.: US 9,097,527 B2
(45) Date of Patent: Aug. 4, 2015

(54) METHOD AND SYSTEM FOR GENERATING A ROUTE

(75) Inventors: Joakim Notstrand, Linköping (SE); Pär Norberg, Vreta Kloster (SE); Johan Ivansson, Linköping (SE); Erik Skarman, Linköping (SE)

(73) Assignee: SAAB AB, Linköping (SE)

( * ) Notice: Subject to any disclaimer, the term of this patent is extended or adjusted under 35 U.S.C. 154(b) by 1229 days.

(21) Appl. No.: 11/538,819

(22) Filed: Oct. 5, 2006

(65) Prior Publication Data

US 2007/0112478 A1    May 17, 2007

(30) Foreign Application Priority Data

Oct. 7, 2005    (EP) .................................... 05109359

(51) Int. Cl.
*G01C 21/00*  (2006.01)
*G01C 21/34*  (2006.01)
*G01C 11/00*  (2006.01)
*G08G 1/0968* (2006.01)

(52) U.S. Cl.
CPC ................ *G01C 21/00* (2013.01); *G01C 11/00* (2013.01); *G01C 21/34* (2013.01); *G08G 1/096827* (2013.01)

(58) Field of Classification Search
CPC ........ G01C 21/20; G01C 21/26; G01C 21/34; G01C 21/3446; G01C 21/3626; G08G 1/096827; G08G 1/096861; G08G 1/096866; G08G 1/0969

USPC ......... 701/200, 202, 208–210, 400, 409–411; 340/988, 995.19–995.27
See application file for complete search history.

(56) References Cited

U.S. PATENT DOCUMENTS

| 4,086,632 | A | * | 4/1978  | Lions ............................ 701/210 |
| 4,975,696 | A | * | 12/1990 | Salter et al. .................... 340/973 |
| 5,050,771 | A | * | 9/1991  | Hanson et al. ..................... 222/1 |
| 5,884,224 | A | * | 3/1999  | McNabb et al. ................... 702/2 |
| 5,894,323 | A | * | 4/1999  | Kain et al. ...................... 348/116 |
| 6,016,116 | A | * | 1/2000  | Henderson et al. ............. 342/64 |
| 6,112,143 | A |   | 8/2000  | Allen et al. |
| 6,128,574 | A | * | 10/2000 | Diekhans ....................... 701/209 |
| 6,195,611 | B1 | * | 2/2001 | Sakamoto et al. ............ 701/209 |
| 6,236,924 | B1 | * | 5/2001 | Motz et al. ....................... 701/50 |
| 6,501,422 | B1 | * | 12/2002 | Nichols .................... 342/357.36 |
| 6,532,417 | B2 | * | 3/2003 | Hatano .......................... 701/207 |

(Continued)

FOREIGN PATENT DOCUMENTS

DE    100 25 829 A1    12/2001
EP    0 821 296 B2    1/1998

(Continued)

*Primary Examiner* — Jack W Keith
*Assistant Examiner* — Chuong P Nguyen
(74) *Attorney, Agent, or Firm* — Venable LLP; Eric J. Franklin (57) ABSTRACT

A method for generating a route including at least one path. The method is suitable for aircraft reconnaissance of an area. The method includes encompassing the area with a geometrical figure, generating a first direction depending upon a configuration of the figure, generating the at least one path depending upon the first direction wherein the path corresponds to a sub area covering at least a part of the area.

20 Claims, 6 Drawing Sheets

(56) References Cited

U.S. PATENT DOCUMENTS

| | | | |
|---|---|---|---|
| 6,597,992 B2 * | 7/2003 | Rooney et al. | 702/5 |
| 6,728,607 B1 * | 4/2004 | Anderson | 701/25 |
| 6,876,920 B1 * | 4/2005 | Mailer | 701/207 |
| 6,907,336 B2 * | 6/2005 | Gray et al. | 701/50 |
| 6,934,615 B2 * | 8/2005 | Flann et al. | 701/50 |
| 7,010,425 B2 * | 3/2006 | Gray et al. | 701/202 |
| 7,065,449 B2 * | 6/2006 | Brewster et al. | 702/5 |
| 7,136,726 B2 * | 11/2006 | Greenfeld et al. | 701/3 |
| 7,228,214 B2 * | 6/2007 | Flann et al. | 701/50 |
| 7,308,342 B2 * | 12/2007 | Greenfeld et al. | 701/3 |
| 7,502,678 B2 * | 3/2009 | Diekhans et al. | 701/50 |
| 7,633,632 B2 * | 12/2009 | Sasakawa et al. | 356/601 |
| 8,060,299 B2 * | 11/2011 | Gharsalli et al. | 701/425 |
| 2004/0068352 A1 * | 4/2004 | Anderson | 701/25 |
| 2007/0250264 A1 * | 10/2007 | Sekine et al. | 701/208 |

FOREIGN PATENT DOCUMENTS

| | | | | |
|---|---|---|---|---|
| JP | 2002/211494 A | * | 7/2002 | B64C 13/20 |
| JP | 2002211494 A | | 7/2002 | |

* cited by examiner

Fig 8c

METHOD AND SYSTEM FOR GENERATING A ROUTE

FIELD OF THE INVENTION

The invention relates in general to an arrangement and system to generate a route of reconnaissance of a geographical area. In particular the invention relates to aircraft reconnaissance of a geographical area.

The invention also relates to a method for generating a route for aircraft reconnaissance.

Furthermore, the invention relates to software adapted to perform method steps for generating a route of aircraft reconnaissance when executed on a computer.

BACKGROUND

Today, aircraft reconnaissance is used in a variety of different situations. These can relate to military as well as civilian applications. Searches may be directed toward individuals, troops, vehicles, or other objects. Furthermore, aircraft reconnaissance may be used for such purposes as detecting fires at an early stage, or to simply search a predetermined area of a terrain of particular interest.

It is foreseen that a common future use of Unmanned Aerial Vehicle (UAV's) will be for searching a predetermined area of a terrain of particular interest. However, it is presently difficult to control UAV's in a way that produces a time- and cost-effective search of a predetermined area.

JP 2002211494 schematically depicts route planning for an unmanned helicopter wherein the flight is preformed using paths which minimize the total length of the route.

SUMMARY OF THE INVENTION

One aspect of the present invention relates to the problem of providing an improved generation of a reconnaissance route.

Another aspect of the invention relates to the problem of providing a route which offers improved time- and cost-effectiveness aircraft reconnaissance of a predetermined area.

Yet another aspect of the invention relates to the problem of achieving a more robust generation of a reconnaissance route in real time.

One aspect of the present invention relates to the problem of organising scouting of a search area so that coverage of the area is optimized.

These problems are solved by a method for generating a route comprising separated paths covering a search area; the method comprising the step of:

dividing the search area into paths, wherein the paths are assigned a direction of reconnaissance which minimizes the total distance of transportation between the separated paths.

Preferably the search area is adjusted dynamically so as to reduce in size as the paths are covered.

One benefit of the method according to the present invention is that an aircraft reconnaissance route, which is optimized with respect to the characteristics of sensors on board such as resolution, range of vision or angel of coverage, is achieved.

The problems in the art are also solved by the present invention which provides a novel control unit, suitable for generating a route comprising at least one path for aircraft reconnaissance of a first area, comprising means for encompassing the first area with a geometrical figure;

means for generating a first direction depending upon a configuration of the figure; and means for generating the at least one path depending upon the first direction, wherein the path corresponds to a sub area covering at least a part of the area, wherein a minimum quantity of paths is required to cover the first area with corresponding sub areas.

Preferably, the control unit further comprises:

means for generating the at least one path, wherein the path is substantially parallel with a longest side of the figure, and means for generating the at least one path, wherein its corresponding sub area is strip-shaped.

Preferably, the control unit further comprises:

means for generating at least two paths, wherein the paths are substantially parallel.

Preferably, the control unit further comprises:

means for generating at least two paths so that their corresponding sub areas are partly overlapping.

Preferably, the control unit further comprises:

means for encompassing the first area with a rectangle, wherein the area of the rectangle is as small as possible.

Preferably, the control unit further comprises:

means for generating end markers defining ends of the at least one path, depending upon the configuration.

Preferably, the control unit further comprises:

means for adjusting the generated route dynamically depending upon recorded interrupt information.

Preferably, the control unit further comprises:

means for generating a plurality of area points, wherein the area points define corners of the first area.

By use of an automatic system for planning the search of a predetermined area of a terrain the route for a manned or unmanned aircraft may be optimized against a number of criteria providing an effective search in all respects.

Use of the claimed method for generating a route results in minimization of the necessary length of an aircraft reconnaissance route to cover a predetermined area of a terrain. A beneficial consequence is that fuel consumption by the scouting aircraft searching a predetermined area of a terrain is optimized.

Preferably, advancement of the aircraft along the route is recorded in a memory, such that resuming an interrupted aircraft reconnaissance is facilitated. Recording the advancement of the aircraft along the route further allows other aircraft within a fleet to resume an interrupted aircraft reconnaissance.

The method according to the invention is robust and reliable meaning that few sources of errors are provided. The method does not involve a heavy computational burden. The method is easy to implement as software for a computer.

The method according the invention is further applicable to most shapes of search areas. Since the method preferably is performed automatically a lower burden is on the pilot of the aircraft.

According to a favorable aspect of the invention said route is generated automatically in real time when the area points are communicated to an aircraft on its way to the search area, which further decreases the time required to begin a search of the specified search area along at least a part of the route.

Additional objects, advantages and novel features of the present invention will become apparent to those skilled in the art from the following details, as well as by practice of the invention. While the invention is described below, it should be understood that the invention is not limited to the specific details disclosed. A person skilled in the art having access to the teachings herein will recognise additional applications, modifications and embodiments in other fields, which are within the scope of the invention.

BRIEF DESCRIPTION OF THE DRAWINGS

For a more complete understanding of the present invention and further objects and advantages thereof, reference is now made to the following description of examples as shown in the accompanying drawings, in which.

DETAILED DESCRIPTION OF THE DRAWINGS

Figure 1:
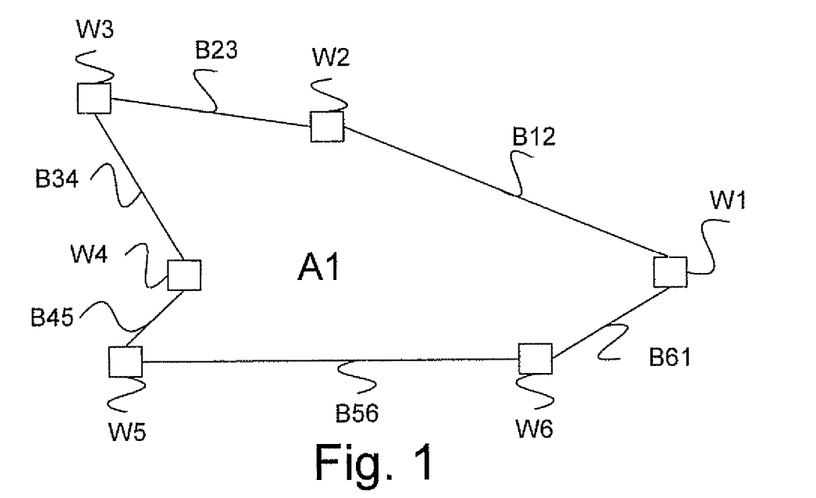
FIG. 1 schematically illustrates a plurality of area points encompassing a search area.

With reference to FIG. 1 a plurality of area points W1-W6 are shown. The area points represent coordinates defining an area A1 of a terrain or a geographical area. The area A1 is the area of interest which is to be subjected to aircraft reconnaissance. A1 is referred to herein as the search area or scout area. Area points W1-W6 are generated by an operator. Alternatively, the area points can be generated automatically. In this particular example six area points are generated, however, an arbitrary number of area points may be generated depending upon factors such as topology of the terrain and climate. T area points can be generated, where T is a positive integer. According to one embodiment T equals 10.

Area A1 defined by area points W1-W6 can be 100 square kilometers. Alternatively, area A1 can be 1000 square kilometers. The size of area A1 is not limiting to the inventive method. For example, if the aircraft reconnaissance concerns finding a ship at sea, the aircraft can fly at a relatively high altitude, while still allowing an effective search, and therefore area A1 can be very large, i.e. in the range 10,000-100,000 square kilometers, or even larger.

The lines interconnecting the area points are herein referred to as area legs B12-B61, as indicated in the figure. The number assigned to an area leg Bxx is the two numbers of the area points it interconnects, in counter-clockwise order. Thus, the area leg located counter-clockwise to W2 and clockwise to W3 is B23.

Figure 2:
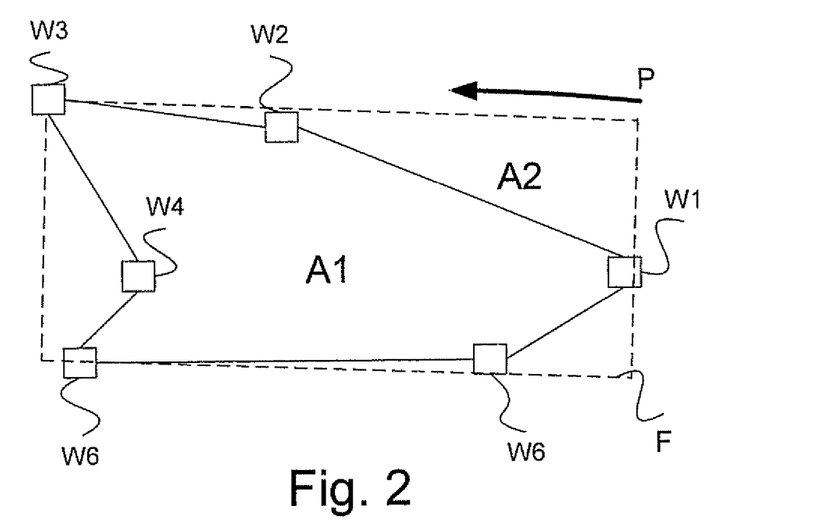
FIG. 2 schematically illustrates a geometrical figure encompassing the plurality of area points according to an aspect of present invention.

FIG. 2 schematically illustrates a geometrical figure F encompassing area points W1-W6 according to an aspect of the invention. Geometrical figure F is generated so as to encompass area A1. In a preferred embodiment a rectangle is generated, as shown in the figure. Other geometrical figures can also be generated and used according to the present invention. Geometrical figure F can be a trapezoid. However, the longest side of the geometrical figure is chosen to be the direction of reconnaissance P.

In the present case direction of reconnaissance P is parallel with one side of geometrical figure F, which also is one of the two longer sides forming the rectangle. Special cases related to irregularly-formed search areas are described in further detail below.

There are thus four different possibilities of generating direction of reconnaissance P in this particular case, namely two opposite directed directions of reconnaissance for each one of the longer sides of the rectangle. Which direction is chosen depends on, for example, where an aircraft is located relative the search area before the search is initiated. Another aspect relates to where the aircraft is supposed to fly after the search of the area is performed.

Figure 3:
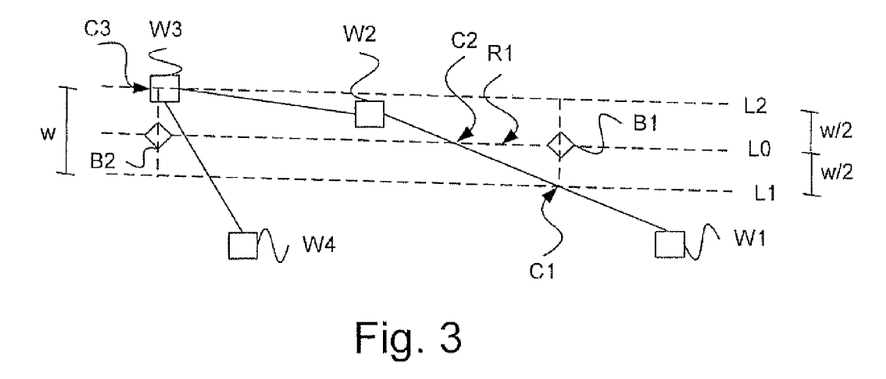
FIG. 3 schematically illustrates a path according to an aspect of present invention.

FIG. 3 schematically illustrates two end strip markers B1 and B2 according to an aspect of the invention. The strip markers define end positions of a first path R1. First path R1 is a part of a route.

The position of end strip marker B1 is generated based on what width w the sensor/sensors is/are capable of covering on the ground given a particular flying altitude. As shown in the figure, lines L1 and L2 represent the outer limits of the width that one or several sensors are capable of covering given a predetermined flying altitude. These lines are parallel to each other and to L0. L1 and L2 are each separated from L0 by a distance w/2. End strip marker B1 is placed on L0 perpendicular to the first point (in the direction of flight) where either L1 or L2 intersects a leg connecting two area points. In this particular example L1 intersects a leg between W1 and W2 at a point C1.

The highest allowed flying altitude is calculated depending upon a particular mission's claim on sensor resolution and performance. Often the highest allowable flying altitude is chosen because it maximizes the surface area which the sensors can cover. This area is defined by the lines L1 and L2 in the figure.

The flying altitude of the aircraft depends on several factors. For example, it may depend on weather conditions, what object is to searched for, type of sensors onboard, required quality of recorded information such as film quality, etc.

The end strip marker B2 is generated in a similar way as B1, i.e. B2 is placed on L0 perpendicular to the last point (in the direction of flight) where either L1 or L2 intersects a leg connecting two area points. In this particular example L2 intersects a corner of the search area provided at W3, which also is a corner of the generated rectangle, at a point C3.

According to one embodiment one sensor is arranged to cover only one side of the aircraft, such as the area between the lines L0 and L1 or the area between the lines L0 and L2, each of a width w/2. According to one embodiment two different sensors are used, which sensors may have different angles of coverage meaning different fields of view. This is, however, taken into account when generating the end strip markers B1-BN.

Figure 4:
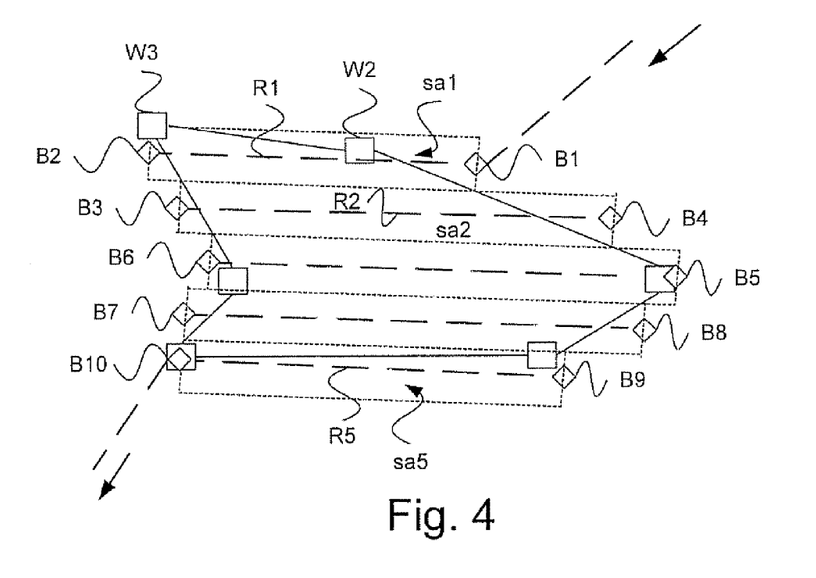
FIG. 4 schematically illustrates a plurality of paths according to an aspect of present invention.

FIG. 4 schematically illustrates a plurality of reconnaissance strips according to an aspect of the invention. The figure depicts how the entire search area is covered with paths R1-R5 corresponding to the lines B1-B2, B3-B4, B5-B6, B7-B8 and B9-B10, respectively. The search area is thus, according to this example, divided into five reconnaissance strips sa1-sa5. Each reconnaissance strip sa1-sa5 corresponds to a path R1-R5, respectively.

In this case it was decided that the aircraft should start at B1 and then fly along the paths R1-R5 in a sequential manner, i.e. passing the end strip markers B1-B10 in numerical order.

In an alternative embodiment the paths R1-R5 can be followed in another order, for example in the order R1, R4, R2, R3 and R5, corresponding to passing the end strip markers in the following order: B1, B2, B7, B8, B4, B3, B6, B5, B9 and B10. Other routes are also possible. However, one aspect of the invention relates to reducing fuel consumption by reconnaissance aircraft. By choosing a route comprising paths R1-R5 which minimizes flying distance outside the search area, fuel may be saved. For example, care should be taken to minimum the turning radius of the aircraft because increasing turning radius corresponds to an increase in fuel consumption.

Figure 5A:
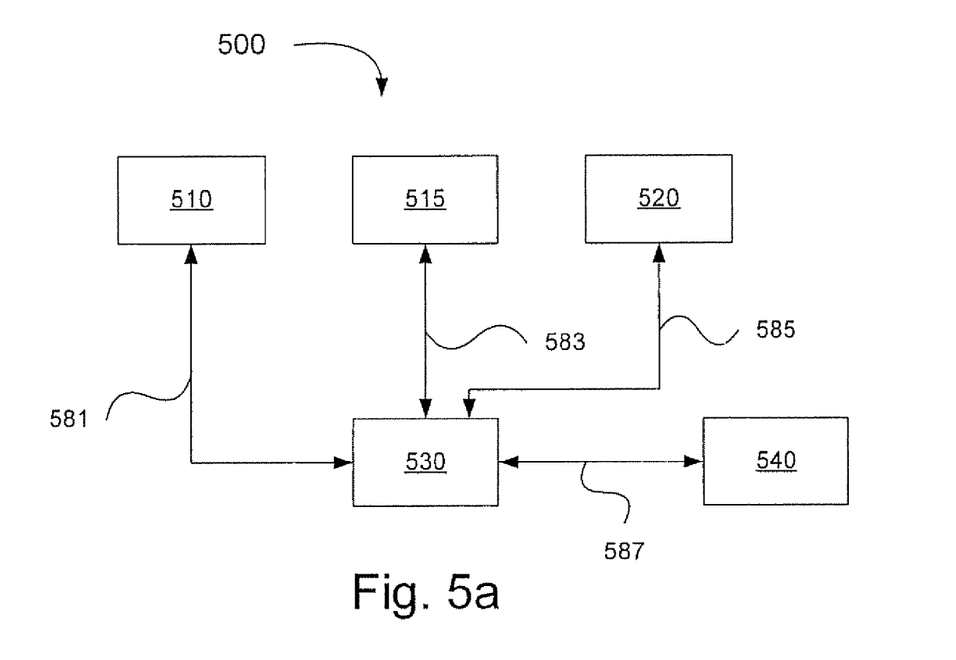
FIG. 5a schematically illustrates a platform according to an aspect of present invention.

FIG. 5a schematically illustrates a platform 500 comprising sensors according to an aspect of the invention. According to one embodiment platform 500 is an airplane. The platform could alternatively be an unmanned aerial vehicle (UAV). In yet another embodiment the platform is a helicopter.

Platform 500 comprises a processing unit 530. Processing unit 530 is also referred to as control unit or computer. The processing unit 530 is also referred to as arrangement or calculation device. A first sensor 510 is arranged for communication with processing unit 530 via a first wire 581. A second sensor 515 is arranged for communication with processing unit 530 via a second wire 583. A third sensor 520 is arranged for communication with processing unit 530 via a third wire 585. A transmitting/receiving means 540 is arranged for communication with processing unit 530 via a fourth wire 587.

According to one embodiment second sensor 515 is a digital camera adapted to film in real time. According to one embodiment third sensor 520 is an IR-camera adapted to film in real time. Various suitable sensors may of course be used.

Sensors 510, 515 and 520 are arranged to send information to processing device 530 in real time. The processing device is arranged to relay the information and, via transmitting/receiving means 540, send the information to a unit as described below. The processing device is arranged to store the information in a memory enclosed therein. According to one embodiment the processing device is arranged to automatically process the information so as to detect a wanted object, such as a vehicle or a person.

It should be noted that platform 500 can be a ground vehicle, such as an automobile, truck, full-track vehicle, rail car, crawler-type vehicle or cross-country truck. Search performed on land, such as in a desert or a forest, may thus also be performed by means of a ground vehicle. It is clear that a method for generating a route according to the invention also may apply to a ground vehicle provided with suitable sensors, such as IR-cameras.

It should also be noted that platform 500 can be a water craft such as a motor boat, sailing boat or jet-ski. Search performed on a water body, such as a lake or a sea may thus be performed by means of a water craft. It is clear that a method for generating a route according to the invention also may apply to a water craft provided with suitable sensors, such as echo sounders or cameras.

Figure 5B:
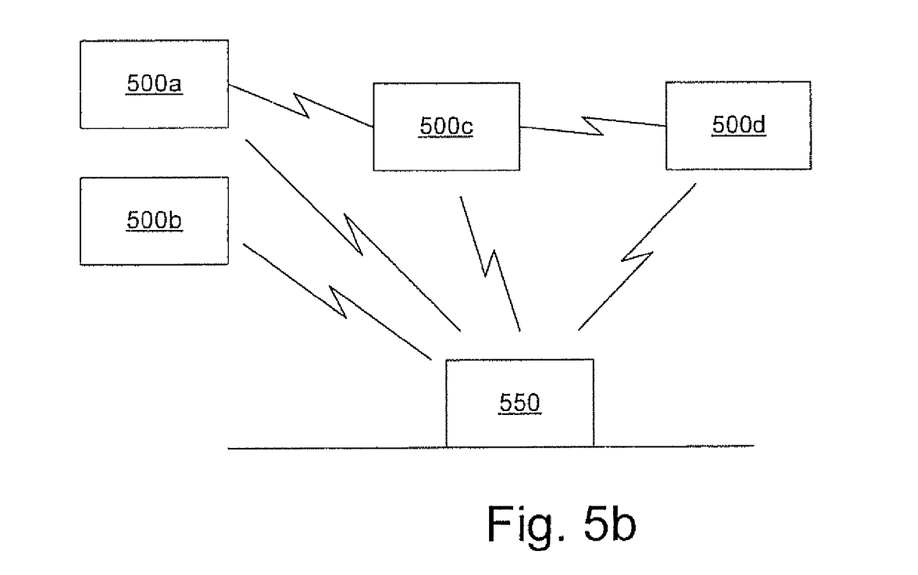
FIG. 5b schematically illustrates a system comprising a plurality of platforms according to an aspect of present invention.

FIG. 5b depicts a plurality of platforms 500a-d which are arranged for individual communication with a central unit 550. Central unit 550 may be a military command centre or a civilian control tower. Platforms 500a-d correspond to the platform depicted with reference to FIG. 5a. Platforms 500a-d are further arranged for communication with each other.

According to one embodiment the platforms cooperates to perform a reconnaissance of a search area together. According to this embodiment the platforms are arranged to continuously update what paths are covered by which platform.

Figures 6A, 6B:
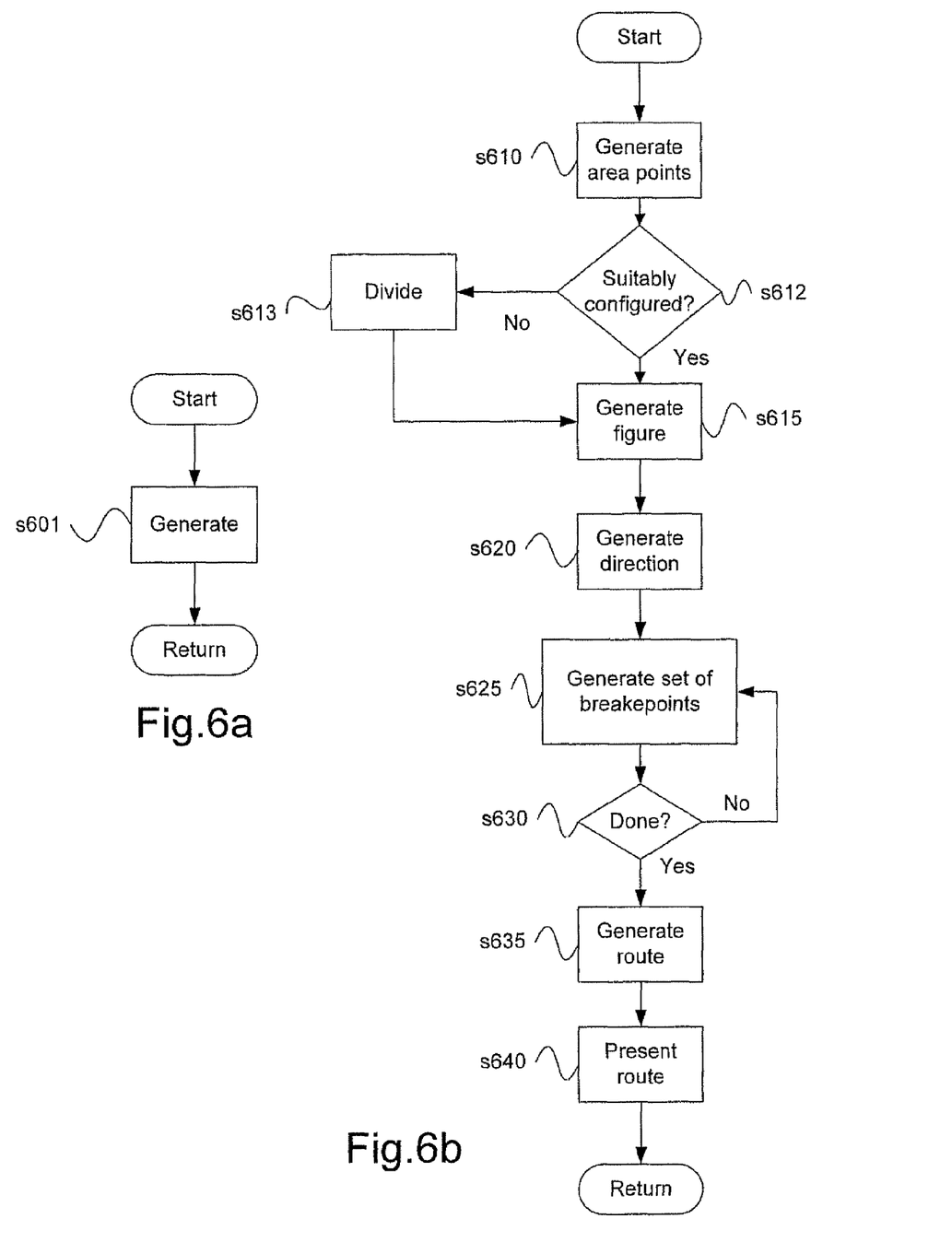
FIG. 6a schematically illustrates a method for generating a route according to an aspect of present invention.
FIG. 6b schematically illustrates in greater detail a method for generating a route according to an aspect of present invention.

FIG. 6a schematically illustrates a method for generating a route comprising at least one path, wherein the method is suitable for aircraft reconnaissance of a first area according to an aspect of the invention. The method comprises a first method step s601. First method step s601 comprises the steps of encompassing the first area with a geometrical figure;
generating a first direction depending upon a configuration of the figure;
generating the at least one path depending upon the first direction, wherein the path corresponds to a sub area covering at least a part of the area, wherein a minimum quantity of paths is needed to cover the first area with corresponding sub areas.

Preferably the method comprises the step of:
generating the at least one path, wherein the path is substantially parallel with a longest side of the figure.

Preferably the method comprises the step of:
generating the at least one path, wherein the sub area is strip-shaped.

Preferably the method comprises the step of:
generating at least two paths, wherein the paths are substantially parallel.

Preferably the method comprises the step of:
generating at least two paths so that the corresponding sub areas are partly overlapping. This has the positive effect that it allows for dealing with navigational error and movable searched objects, such as animals or vehicles. The overlapping may further be used to facilitate matching of recorded material corresponding to different paths.

Preferably the method comprises the step of:
encompassing the first area with a rectangle, which rectangle is as small as possible.

Preferably the method comprises the step of:
generating end markers defining ends of the at least one path, depending upon the configuration.

Preferably the method comprises the step of:
dynamically adjusting the generated route depending upon recorded interrupt information.

Preferably the method comprises the step of:
generating a plurality of area points, wherein the area points define corners of the first area. According to one embodiment an operator generates the area points in a control arrangement, and further transmits the coordinates to one or several platforms for processing according to the invention, i.e. route generation.

According to another embodiment the route generation is performed on the ground in a command centre, fly tower or communication centre and transmitted to one or more platforms which later perform the search of the area following the route.

FIG. 6b schematically illustrates in greater detail a method for generating a route, suitable for aircraft reconnaissance, according to an aspect of the invention.

The method comprises a first method step s610. In method step s610 a plurality of area points W1-WM, where M is a positive integer, defining a search area A1, are generated. According to one example six area points W1-W6 are generated. After method step s610 a subsequent method step s612 is performed.

In method step s612, a check whether or not the search area is suitably configured is performed. The term suitably configured refers to the shape of search area A1 to which the procedure of the invention is easily applicable. If the search area is suitably configured a next step s615 is performed. If the search area not is suitably configured a method step s613 is performed.

In method step s613 the not suitably configured search area is divided into at least two suitably configured sub search areas, which are then treated separately. According to one embodiment the different sub search areas are processed in parallel. After the method step s613 a subsequent method step s615 is performed.

In method step s615 a geometrical figure F is generated. According to one embodiment the figure is a rectangle encompassing the area A1. Said rectangle is the smallest rectangle possible which still encompasses area A1. This means that at least one of the area points W1-W6 is provided on each side of the rectangle, a corner of the rectangle is equivalent to at least one side of the rectangle. After method step s615 a subsequent method step s620 is performed. Skilled workers appreciate how the method is configured where geometrical figure F is not a rectangle In method step s620 a direction of reconnaissance P is generated. The direction is generated based upon an orientation of one of the longer sides of the rectangle. This procedure is described in greater detail with reference to FIG. 2. After method step s620 a subsequent method step s625 is performed In method step s625 a first set of break points B1 and B2 are generated. Break points are also referred to as end strip markers or end markers. The break points B1 and B2 are generated (based on factors such as sensor characteristics including field of vision and flying altitude), overlap of search field, and others. After method step s625 a subsequent method step s630 is performed In method step s630 a check is performed to see whether or not the whole of the area A1 is covered by search strips defined by a length of a line connecting the break points, and having a width $$2 \cdot \frac{w}{2}.$$

If the whole of the area A1 is covered by one or more search strips a subsequent method step s635 is performed. If the whole of the area A1 is not covered by search strips a new set of break points B3 and B4 are generated, and method step s630 is performed again.

In method step s635 a route is generated. After the method step s635 a subsequent method step s640 is performed In method step s640 the route is presented to a pilot of the aircraft. In case the aircraft is unmanned the route is not displayed in the aircraft. Alternatively, the route is displayed for a UAV-operator on ground. After the method step s640 the method ends. In alternate embodiments which do not rely on aircraft, the route is presented to the equipment operator.

Figure 7:
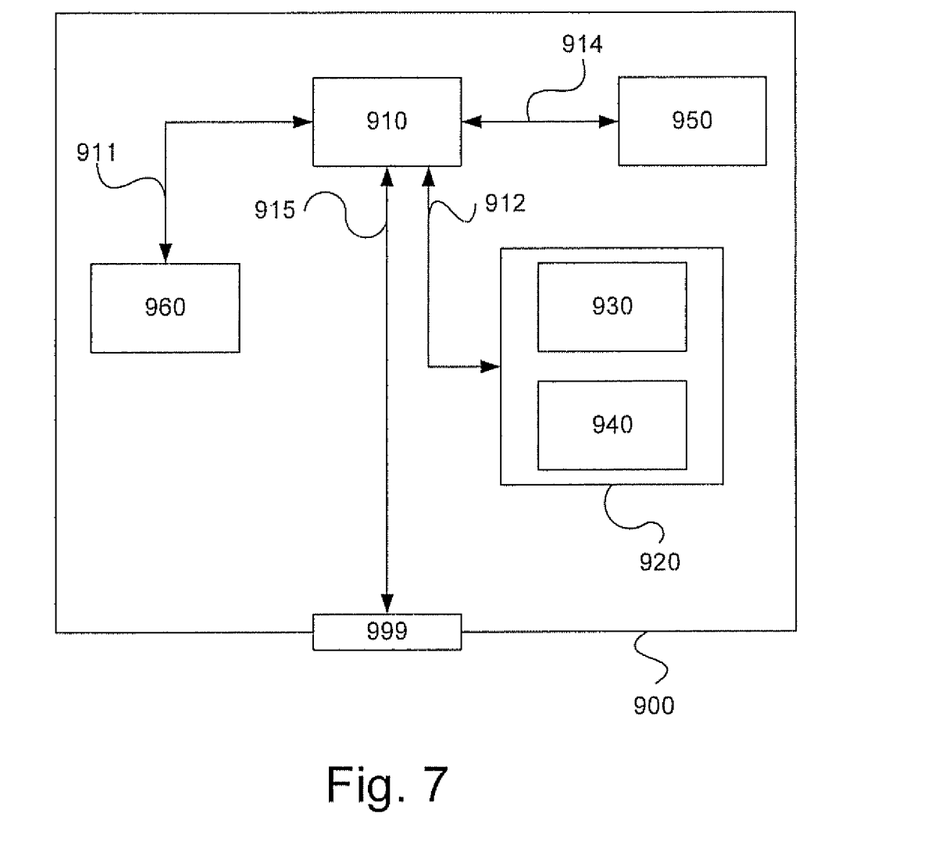
FIG. 7 schematically illustrates an apparatus according to an aspect of present invention.

With reference to FIG. 7, a diagram of one embodiment of an apparatus 900 is shown. The above-mentioned computer 530 or a monitoring device (not shown) may include apparatus 900. Apparatus 900 comprises a non-volatile memory 920, a data processing device 910 and a read/write memory 950. Non-volatile memory 920 has a first memory portion 930 wherein a computer program, such as an operating system, is stored for controlling the function of apparatus 900. Further, apparatus 900 comprises a bus controller, a serial communication port, I/O-means, an A/D-converter, a time date entry and transmission unit, an event counter and an interrupt controller (not shown). Non-volatile memory 920 also has a second memory portion 940.

A computer program comprising routines for carrying out processing and analysis of the area points, geometrical figure F, direction of reconnaissance P, end strip markers B1-BN, paths R1-RT, etc, is provided. The program may be stored in an executable manner or in a compressed state in a separate memory 960 and/or in read/write memory 950.

Data processing device 900 may be, for example, a microprocessor.

When it is described that data processing device 910 performs a certain function it should be understood that data processing device 910 performs a certain part of the program which is stored in separate memory 960, or a certain part of the program which is stored in read/write memory 950.

Data processing device 910 may communicate with a data port 999 by means of a data bus 915. Non-volatile memory 920 is adapted for communication with data processing device 910 via data bus 912. Separate memory 960 is adapted to communicate with data processing device 910 via data bus 911. Read/write memory 950 is adapted to communicate with data processing device 910 via a data bus 914.

When data is received on data port 999 it is temporarily stored in second memory portion 940. When the received input data has been temporarily stored, data processing device 910 is set up to perform execution of code in a manner described above. According to one embodiment, data received on data port 999 comprises information such as the area point coordinates and/or geometrical figure F, direction of reconnaissance P, end strip markers B1-BN, paths R1-RT. This information can be used by apparatus 900 so as to generate the route according to the invention.

Parts of the methods described herein can be performed by apparatus 900 by means of data processing device 910 running the program stored in separate memory 960 or read/write memory 950. When apparatus 900 runs the program, parts of herein described methods are executed.

An aspect of the invention relates to a computer programme comprising a programme code for performing the method steps depicted with reference to FIGS. 6a and 6b, when the computer programme is run on a computer.

An aspect of the invention relates to a computer programme product comprising a program code stored on computer-readable media for performing the method steps depicted with reference to FIGS. 6a and 6b, when the computer programme is run on the computer.

An aspect of the invention relates to a computer programme product directly storable in an internal memory into a computer, comprising a computer programme for performing the method steps depicted with reference to FIGS. 6a and 6b, when the computer programme is run on the computer.

Figure 8A:
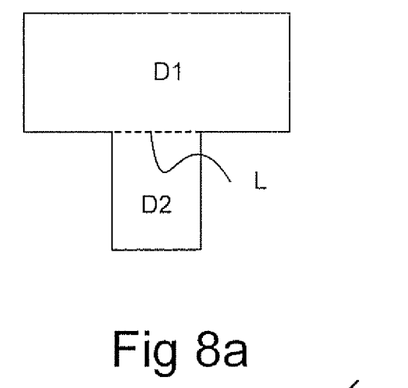
FIGS. 8a-c schematically illustrate special cases of different search areas.

FIG. 8a schematically illustrates a substantially T-formed search area. According to one embodiment the T-formed search area is divided into two parts D1 and D2 separated by a line L. Parts D1 and D2 are separately subjected to the method according to the invention as described above.

Figure 8B:
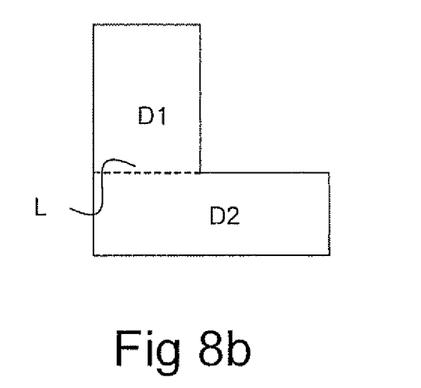

FIG. 8b schematically illustrates a substantially L-formed search area. According to one embodiment the L-formed search area is divided into two parts D1 and D2 separated by a line L. Parts D1 and D2 are separately subjected to the method according to the invention as described above.

Figure 8C:
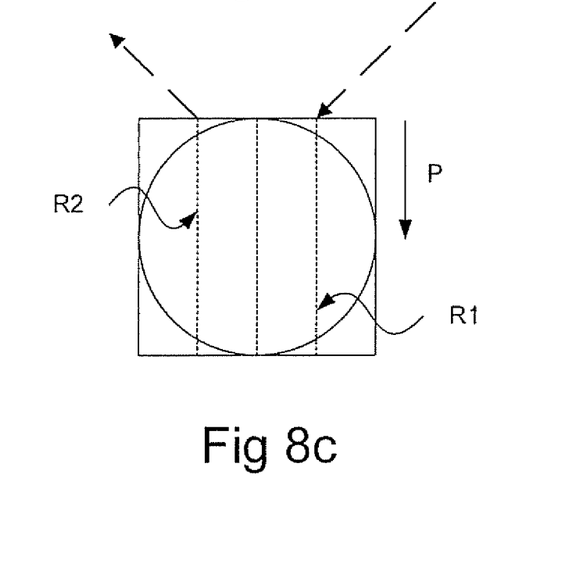

FIG. 8c schematically illustrates a circular search area. In this case a square and not a rectangle is generated. Since the sides are of equal lengths, the direction of the reconnaissance P is parallel with an arbitrary side of the square. One side of the square is however chosen, as indicated in the figure.

It should be noted that the method for generating a route may be applicable to various fields of technology. One field concerns spray treatment of agricultural fields such as corn from an airplane or helicopter.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A method for generating a reconnaissance route comprising at least one path for guiding a vehicle, having at least one sensor configured to obtain sensor data of a search area of interest, the method comprising:
    defining a non-rectangular search area through which the at least one path will pass, wherein the search area is defined by a number of area points and legs connecting the points, wherein the legs define the perimeter of the search area;
    generating a quadrilateral encompassing the search area, wherein the generated quadrilateral is a smallest quadrilateral that entirely encompasses the search area, wherein each side of the quadrilateral intersects at least one of the area points;
    generating a first route direction, based on an orientation of a longer side of the generated quadrilateral;
    generating the at least one path along the first route direction, wherein the at least one path has a width that corresponds to a separate sub area which covers at least a portion of the search area, wherein said width is related to a width that the at least one sensor is capable of covering on the ground given a particular flying altitude, wherein a number of paths are generated such that the widths of the paths cumulatively cover the search area;
    generating the route along the at least one path for maneuvering the vehicle through the search area so as to enable obtaining sensor imagery of the defined search area using the at least one sensor; and
    maneuvering the vehicle through the search area according to the generated route and obtaining sensor imagery of the defined search area using the at least one sensor.

2. The method according to claim 1, wherein said at least one path is generated to be substantially parallel with a longest side of the quadrilateral.

3. The method according to claim 2, wherein each of the separate sub areas is strip shaped.

4. The method according to claim 2, wherein at least two paths are generated, and wherein the at least two paths are substantially parallel.

5. The method according to claim 1, wherein at least two paths are generated such that corresponding sub areas of the at least two paths are partly overlapping.

6. The method according to claim 1, further comprising:
    adjusting the generated route dynamically depending upon recorded interrupt information.

7. The method according to claim 1, wherein at least two paths are generated, and wherein the paths are assigned a direction which minimizes a total distance of travel between said paths.

8. The method according to claim 1, wherein the quadrilateral is a rectangle or trapezoid.

9. The method according to claim 1, further comprising:
    defining an end strip marker at an end of each path, wherein a location of each end strip marker is such that the sensor will obtain data of all of the search area within the path.

10. The method according to claim 9, wherein each end strip marker is arranged on a line perpendicular to sides of the path such that the line intersects at least one of the legs within the path.

11. A control unit, suitable for generating a reconnaissance route comprising at least one path, the control unit comprising:
    a processor configured to define a non-rectangular search area through which the at least one path will pass, wherein the search area is defined by a number of area points and legs connecting the points, wherein the legs define the perimeter of the search area, generate a quadrilateral encompassing the search area, wherein the generated quadrilateral is the smallest quadrilateral that entirely encompasses the search area, wherein each side of the quadrilateral intersects at least one of the area points, generate a first route direction based on an orientation of a longer side of the generated quadrilateral, and generate the at least one path along the first route direction, wherein the at least one path has a width that corresponds to a sub area which covers at least a portion of the search area, wherein said width is related to a width that at least one sensor is capable of covering on the ground given a particular flying altitude, and wherein a number of paths are generated such that the widths of the paths cumulatively cover the search area, generate the route along the at least one path for maneuvering a vehicle through the search area, so as to enable obtaining sensor imagery of the defined search area using the at least one sensor, maneuver the vehicle through the search area according to the generated route and obtain sensor imagery of the defined search area using the at least one sensor.

12. The control unit according to claim 11, wherein said at least one path is substantially parallel with a longest side of the quadrilateral, and wherein each of the sub areas is strip-shaped.

13. The control unit according to claim 11, wherein the processor is further configured to generate at least two paths, wherein the at least two paths are substantially parallel.

14. The control unit according to claim 13, wherein the sub areas corresponding to the at least two paths are partly overlapping.

15. The control unit according to claim 11, wherein the processor is further configured to generate end markers defining ends of the at least one path, depending upon said the configuration of the quadrilateral.

16. The control unit according to claim 11, wherein the processor is configured to generate the route dynamically depending upon recorded interrupt information.

17. The control unit according to claim 11, wherein the processor is further configured to generate a plurality of search area points, wherein the area points define corners of the search area.

18. A platform, comprising:
    a control unit comprising a processor configured to define a non-rectangular search area through which the at least one path will pass, wherein the search area is defined by a number of area points and legs connecting the points, wherein the legs define the perimeter of the search area, generate a quadrilateral encompassing the search area, wherein the generated quadrilateral is the smallest quadrilateral that entirely encompasses the search area, wherein each side of the quadrilateral intersects at least one of the area points, generate a first route direction based on an orientation of a longer side of the generated quadrilateral, and generate the at least one path along the first route direction, wherein the at least one path has a width that corresponds to a sub area which covers at least a portion of the search area, wherein said width is related to a width that at least one sensor is capable of covering on the ground given a particular flying altitude, and wherein a number of paths are generated such that the widths of the paths cumulatively cover the search area, generate the route along the at least one path for maneuvering a vehicle through the search area, so as to enable obtaining sensor imagery of the defined search area using the at least one sensor, maneuver the vehicle through the search area according to the generated route and obtain sensor imagery of the defined search area using the at least one sensor; and an airplane, an Unmanned Aerial Vehicle, a helicopter, a robot, or a missile, wherein the control unit is arranged with the airplane, Unmanned Aerial Vehicle, helicopter, robot, or missile.

19. A communication system, comprising:

at least one platform comprising a control unit comprising a processor configured to define a non-rectangular search area through which the at least one path will pass, wherein the search area is defined by a number of area points and legs connecting the points, wherein the legs define the perimeter of the search area, generate a quadrilateral encompassing the search area, wherein the generated quadrilateral is the smallest quadrilateral that entirely encompasses the search area, wherein each side of the quadrilateral intersects at least one of the area points, generate a first route direction based on an orientation of a longer side of the generated quadrilateral, and generate the at least one path along the first route direction, wherein the at least one path has a width that corresponds to a sub area which covers at least a portion of the search area, wherein said width is related to a width that at least one sensor is capable of covering on the ground given a particular flying altitude, and wherein a number of paths are generated such that the widths of the paths cumulatively cover the search area, generate the route along the at least one path for maneuvering a vehicle through the search area, so as to enable obtaining sensor imagery of the defined search area using the at least one sensor, maneuver the vehicle through the search area according to the generated route and obtain sensor imagery of the defined search area using the at least one sensor, and an airplane, an Unmanned Aerial Vehicle, a helicopter, a robot, or a missile, wherein the control unit is arranged with the airplane, Unmanned Aerial Vehicle, helicopter, robot, or missile; and a control arrangement arranged to communicate with the at least one platform.

20. A computer program product, comprising:

a non-transitory computer readable medium; and a programme code recorded on the computer readable medium and executable by a processor for performing a method for generating a reconnaissance route comprising at least one path along which at least one sensor configured to obtain sensor data of a search area of interest travels, the method comprising defining a non-rectangular search area through which the at least one path will pass, wherein the search area is defined by a number of area points and legs connecting the points, wherein the legs define the perimeter of the search area;

generating a quadrilateral encompassing the search area, wherein the generated quadrilateral is a smallest quadrilateral that entirely encompasses the search area, wherein each side of the quadrilateral intersects at least one of the area points;

generating a first route direction, based on an orientation of a longer side of the generated quadrilateral;

generating the at least one path along the first route direction, wherein the at least one path has a width that corresponds to a separate sub area which covers at least a portion of the search area, wherein said width is related to a width that the at least one sensor is capable of covering on the ground given a particular flying altitude, wherein a number of paths are generated such that the widths of the paths cumulatively cover the search area;

generating the route along the at least one path for maneuvering the vehicle through the search area so as to enable obtaining sensor imagery of the defined search area using the at least one sensor; and maneuvering the vehicle through the search area according to the generated route and obtaining sensor imagery of the defined search area using the at least one sensor.

* * * * *